Oct. 25, 1932.  F. K. LANDGRAF  1,883,978
THERMOSTAT
Filed Nov. 21, 1929  2 Sheets-Sheet 1
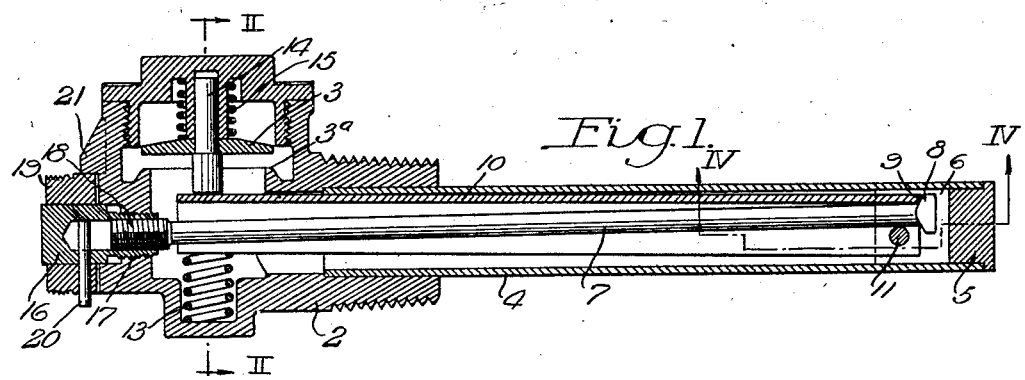
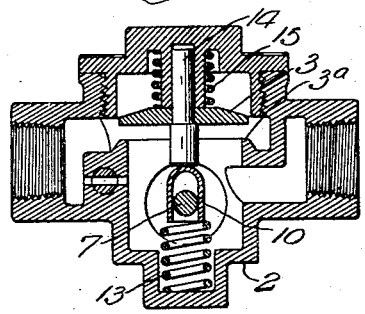
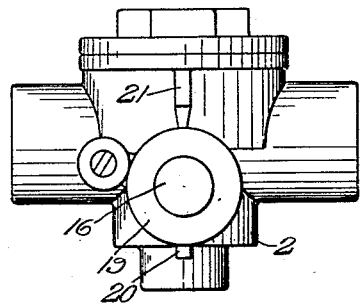
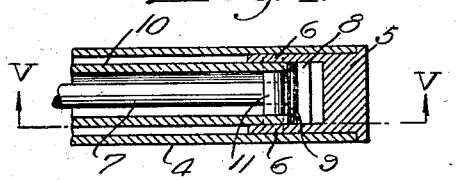
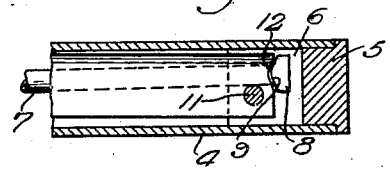
INVENTOR
Frederick K. Landgraf
by his attorneys Oct. 25, 1932.  F. K. LANDGRAF  1,883,978
THERMOSTAT
Filed Nov. 21, 1929  2 Sheets-Sheet 2
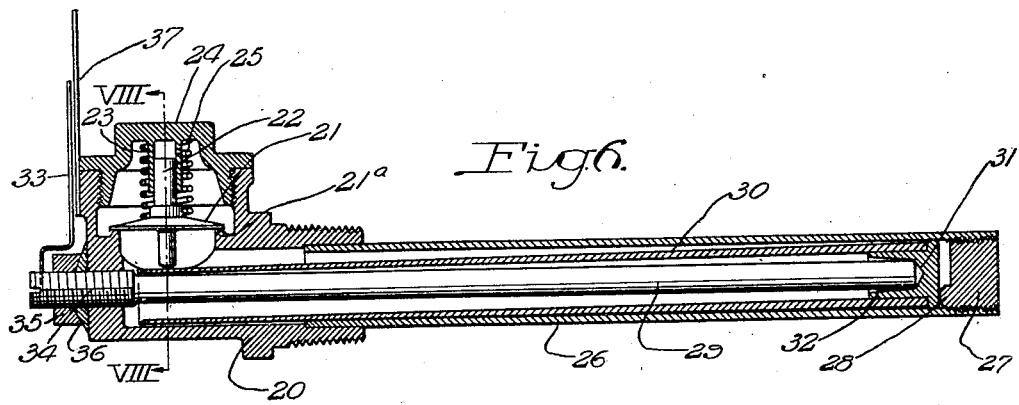
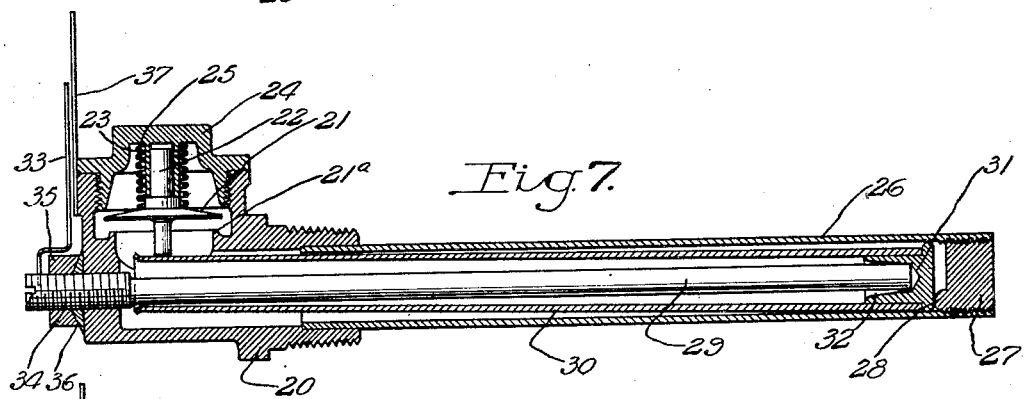
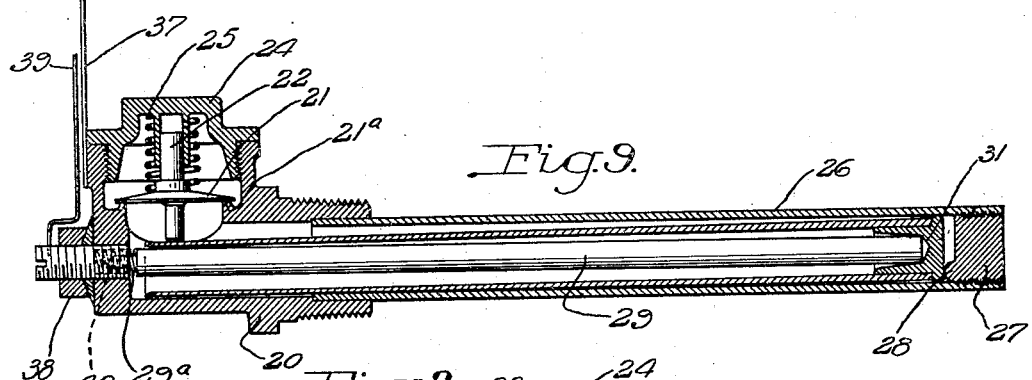
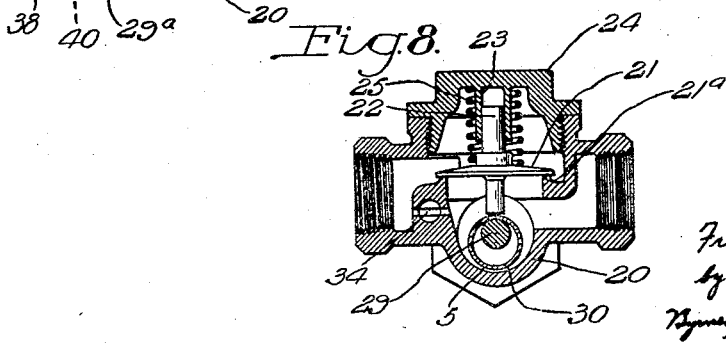
INVENTOR
Frederick K. Landgraf
by his attorneys Patented Oct. 25, 1932

1,883,978

UNITED STATES PATENT OFFICE

FREDERICK K. LANDGRAF, OF CRAFTON, PENNSYLVANIA, ASSIGNOR TO FLANNERY BOLT COMPANY, OF PITTSBURGH, PENNSYLVANIA, A CORPORATION OF DELAWARE

THERMOSTAT

Application filed November 21, 1929. Serial No. 408,811.

This invention relates to thermostats, and more particularly to the mechanism by means of which the relative movement between the expansion element and the so-called non-expansion element is transmitted to the valve or other part to be operated.

A common type of thermostat comprises a body, which may house a valve, from which projects an elongated casing of a material having a relatively high coefficient of thermal expansion. Also supported by the body and extending along inside the tubular casing is a rod having a relatively low or negligible coefficient of thermal expansion. These two elements cooperate to operate a valve or other mechanism. As heretofore generally constructed, the relative movement has been transmitted by a system of multiplying levers in order to obtain the necessary amplitude of motion with a relatively small amount of expansion or contraction of the thermally responsive element of the thermostat. Due to the fact that this relative movement between the thermally responsive member and the other element having a low or negligible coefficient of thermal expansion is so very slight within the range over which some thermostats are adapted to operate, this system of multiplying levers had to be very accurately manufactured and assembled in order that there should be a minimum of lost motion and a maximum utilization of the relative expansion between the two elements of the thermostat. This makes the thermostat quite expensive to manufacture. Furthermore, the constant movement of the various levers results in the wearing of the parts, with the result that lost motion develops even in a well assembled thermostat after a relatively short period of use.

According to the present invention, there is provided a thermostat which is very compact, but wherein the usual system of levers is replaced by a single lever having one very long arm. With this arrangement, a very slight movement of the lever adjacent its fulcrum will cause the outer end of the lever to swing through an arc of considerable amplitude. Since a single long lever replaces the series of multiplying levers heretofore used, practically all of the expansion and contraction of the thermally responsive element of the thermostat can be utilized. The lost motion which exists where there are a series of levers does not exist in a thermostat embodying my invention, and since there are not several levers having motion relative to each other, there is no wearing of the parts through which lost motion in the mechanism can develop.

Thermostats of this type are commonly provided for domestic water heaters, and while they usually operate within a relatively narrow temperature range, they are subjected frequently to very severe temperature changes both in transit and in storage, and even sometimes in the home in extremely cold weather. When the thermostat is subjected to extreme cold, the thermally responsive element contracts far beyond its contraction in the normal temperature range over which it is designed to operate. This imposes in many types of thermostats a considerable strain on the so-called non-expansible element of the thermostat, frequently subjecting it to conditions under which it would tend to bow or warp.

According to the present invention, the mechanism may be such that such strains cannot be imposed on the non-expansible element, and in a preferred embodiment of the invention the non-expansible element is never put under any strain but a tensile strain, and then only when the thermostat is heating.

The invention may be readily understood by reference to the accompanying drawings, in which Figure 1 represents a longitudinal section through a present preferred embodiment of my invention;

Figure 2 is a transverse vertical section in substantially the plane of line II—II of Figure 1;

Figure 3 is a front end elevation of the thermostat shown in Figure 1;

Figure 4 is a detail horizontal section of the inner end of the thermostat assembly in substantially the plane of line IV—IV of Figure 1, the view looking in the direction of the arrows in Figure 1;

Figure 5 is a detail view of the inner end of the thermostat assembly representing a section in substantially the plane of line V—V of Figure 4;

Figure 6 is a view generally similar to Figure 1 showing a modified arrangement with the thermostatically operated valve closed;

Figure 7 is a similar view showing the valve in the open position;

Figure 8 is a transverse vertical section in substantially the plane of line VIII—VIII of Figure 6, and Figure 9 is a view similar to Figure 6 of another modified form of the invention.

Referring first to the form of the invention shown in Figures 1 to 5, inclusive, the thermostat comprises a body 2 in which I have shown an element adapted to be operated by the thermostat. In the drawings, this element is in the form of a valve 3, but obviously the valve could be replaced by a switch or by any other device adapted to receive motion from the thermostat.

Projecting out from the body 2 is preferably a tubular casing 4 whose inner end is rigidly connected to the body 2 and whose outer end is free. This casing 4 constitutes the thermally responsive member of the thermostat, and is preferably made of metal having a relatively high coefficient of thermal expansion. The outer end of the casing 4 is closed by a plug 5, the inner end of which is bifurcated to provide extensions 6 within the casing. This construction is best shown in Figure 4.

Within the casing 4 and extending longitudinally thereof is a rod 7 which has a relatively negligible coefficient of thermal expansion and which constitutes the so-called non-expansible element of the thermostat. This rod may be of Invar steel, or any other material whose coefficient of thermal expansion is negligible or relatively less than the coeffiecient of thermal expansion of the casing 4. The rod 7 has its inner end anchored to the body 2, while the outer end, which is free of the casing 4, has a head portion 8, this head having an inclined surface 9 thereon.

Located within the casing 4 and extending longitudinally thereof is a lever 10 which is substantially coextensive with the rod 7. This lever, in order to have the necessary rigidity and still be received within the casing 4, which is of relatively small diameter, is preferably in the shape of an inverted channel, as clearly shown in Figure 2, the rod 7 being received in this channel. The lever 10 is pivotally supported adjacent the outer end of the expansible casing 4 on a pin 11 which passes through it and which passes through the arms 6 of the bifurcated plug 5.

As shown in Figure 5, the outer end of the lever 10 has a notch 12 therein, the notch cooperating with the cross bar or head 8 on the rod 7. The outer end of the rod 7 may or may not rest on and be supported by the pin 11, but has no connection at all with the pin.

Within the body 2 is a compression spring 13 whose end bears against the bottom of the inner end of the lever 10, as shown in Figures 1 and 2, tending to force this end of the lever up. The valve 3 is carried on a valve stem 14 slidably guided in the body 2, a compression spring 15 being provided within the body for urging the valve shut. The lower end of the valve stem 14 rests on the inner end of the lever 10. It will thus be seen that the spring 13 serves to lift the lever 10 and hold the valve 3 off its seat 3a. However, when the lever 10 is rocked down against the action of the spring 13, the spring 15 acts to move the valve 3 toward its seat 3a.

The lever 10 is moved to the valve-closing position against the action of spring 13 through the expansion of the casing 4 relatively to the rod 7. This is for the reason that as the casing 4 expands with the heat, the plug 5, which supports the pin 11, moves outwardly or to the right, as viewed in Figure 1. This tends to carry the lever 10 in the same direction, but since the end of the lever bears against the head 8 on the rod 7, the lever is not free to move. Consequently, the surface of the notch 12 bears against the inclined surfaces 9 of the head 8. This tends to rock the lever 10 in a counter-clockwise direction about the pivot 11, the inner end of the lever 10 moving against the action of the spring 13. Due to the fact that the distance from the center of the pin 11 to the notch 12 is a very short distance, as compared with the distance from the center of the pin to the inner end of the lever 10, it will be seen that a very minute movement of the outer end of the lever will cause the inner end of the lever to have a proportionally greater movement. A very small relative movement between the outer end of the casing 4 and the outer end of the rod 7 is, therefore, sufficient to cause the lever 10 to swing from a position where the valve is fully opened, as shown in Figure 1, to a position in which the valve is fully closed. Due to the fact that the lever 10 is preferably in the shape of a channel and straddles the rod 7, it is free to move through an arc of sufficient amplitude without interference from the rod 7.

When the thermostat cools, and the casing 4 contracts relatively to the rod 7, the pivot 10 tends to move toward the left, as viewed in Figure 1, tending to move the outer end of the lever 10 away from the head 8. A very slight movement of the outer end of the lever away from the head 8 is sufficient to permit the spring 13 to act to move the lever to the position shown in Figure 1.

Since in contracting, the outer casing 4 tends to move the outer end of the lever 10 away from the head 8 of the non-expansible element, it will be seen that the thermostat can be subjected to extremely low temperatures without imposing any strain on the parts due to the fact that the outer end of the lever 10 is carried with the contraction of the casing 4 further and further away from the head 8.

When the casing 4 is expanding under the action of heat, the strain imposed on the rod 7 is one of tension and not of compression. This has an added advantage in that the spring 13 tends to open the valve while the movement of the lever 10 to permit closing of the valve is positively effected by the engagement of the outer end of the lever with the head 8 of the non-expansible member 7. This is an important safety factor because the hotter the thermostat becomes, the greater is the effort to move the lever 10 down against the action of the spring 13 and let the valve close. This is an advantage over the type of mechanism wherein positive movement of the operating lever under the action of the thermally responsive member occurs on the cooling—not the heating—of the thermostat.

The inner end of the rod 7 is preferably connected to the body 2 through some adjustable connection. This permits the setting of the thermostat to open and close the valve within a very definite temperature range. In the arrangement shown in Figure 1, the inner end of the rod 7 is threaded into a bushing 16. The bushing 16 is screwed into the body 2 at 17. The threads 17 are of a different pitch from the threads, designated 18, between the rod and the bushing. By reason of this differential threading, a complete turn of the bushing 16 advancing or retracting the bushing 16 the distance of one thread into the body 2 will advance or retract the rod a distance equal to the differential in the pitch of the threads 17 and 18. This, in effect, provides a micrometer screw adjustment by means of which an extremely fine adjustment of the thermostat is possible. Carried on the bushing 16 is a knob 19. After the thermostat has been properly adjusted and calibrated, a hole is drilled through the knob 19 and the bushing 16 of the rod and a pin 20 inserted to hold the parts in the proper position, this pin being frictionally retained in place. The outer end of the pin 20 is adapted to contact with a fixed abutment 21 on the front of the casing 2 by means of which the rotation of the knob is confined to approximately 360°. Rotation of the knob, of course, changes the setting of the thermostate, by means of which the temperatures at which the valve opens and closes can be varied. The rod 7 is prevented from turning with the bushing by reason of the engagement of the cross bar 8, the ends of which are preferably square, with the extensions 6 of the plug 5.

The single lever 10, extending coextensively of the thermostat, replaces the system of multiplying levers heretofore commonly provided. By reason of the fact that there is but the single lever provided and that a wide amplitude of movement is obtained in one end of this lever, the full advantage of the relative expansion between the members 4 and 7 is made available without lost motion. The thermostat, therefore, can be adjusted to operate within very fine limits and with a great precision. Not only this, but the only point that can be effected by wear is the point of contact between the end of the lever 10 and the head 8 on the bar 7. This is a great improvement over the types having a multiplicity of levers which involve a multiplicity of wearing surfaces. Moreover, in the present invention the large multiplication of the relative movement of the elements makes a large resultant motion of the valve. This allows the utilization of a smaller valve and at the same time insures ample area of valve opening. The large resultant motion or valve lift makes a smaller percent of lost motion due to wear than would exist if the valve lift were very small, as is the case in the ordinary type.

The construction shown in Figure 1 constitutes a present preferred embodiment of the invention, due to the fact that the spring 13 is effective for opening the valve and the thermostat mechanism operative to close the valve and due to the fact also that no strain is imposed on the rod 7 even when the casing 4 is cooled drastically, and also because any strain imposed on the rod 7 is a tensile strain and not a compressive one. Because the rod 7 is only subjected to tensile strains, it, of course, can be very light, and this is of considerable advantage when the non-expansible element 7 is made of an expensive alloy such as invar. However, the construction shown in Figures 6, 7 and 8 constitutes a modification which is very desirable over present thermostat mechanisms. In the construction shown in Figures 6 and 7, 20 designates a body member corresponding to the member 2 of the construction shown in Figure 1. Within the body member I have shown a thermostatically operated element, such as the valve 21 on the valve stem 22 slidably retained in a guide 23 on a removable cap 24 on the body 20. This valve is adapted to seat on a valve seat 21a formed within the body 20. A compression spring 25 tends to move the valve toward the seat. Projecting out from the body 20 is preferably a tubular casing 26 which constitutes the expansible element of the thermostat. In the outer end of the casing 26 is a plug 27 having a rounded heel 28 on the inner face thereof. Also secured at one end to the body 20 and extending longitudinally within the casing 26 is a rod 29 of a material having a low or negligible coefficient of thermal expansion. This constitutes the so-called non-expansible element of the thermostat.

Extending longitudinally of the casing 26 within the casing is a lever 30 corresponding to the lever 10 of the construction shown in Figure 1. In Figures 6 and 7, however, I have shown the lever 30 as comprising a tube instead of a channel, a tube or a channel providing a rigid lever arm. However, the form of the lever is relatively unimportant. At the outer end of the lever 30 and secured thereto is a block or plug 31. This plug 31 has a cavity 32 therein to receive the outer end of the rod 29 while the outer surface of the plug 31 is adapted to contact with the heel or projection 28 on the plug 27.

When the elements are in the position shown in Figure 6, the projection 28 bears against the outer end of the plug 31. At this time, the valve 21 is closed. As the casing 26 cools and contracts, the heel 28 exerts a pressure on the plug 31. The plug tends to fulcrum about the outer end of the rod 29, causing the lever 30 to be rocked upwardly, as viewed in Figure 6, to the position shown in Figure 7. As the lever arm 30 is rocked upwardly, it lifts the valve off the seat, the extension on the valve stem contacting with the inner end of the lever. Due to the fact that the distance between the outer end of the rod 29 and the projection 28 is relatively short and the distance from the outer end of the rod 29 to the valve stem is relatively long, it will be seen that a very small relative movement between the plug 27 and the end of the rod 29 will swing the end of the lever 30 through an arc of considerable amplitude.

As the thermostat heats up and the casing 26 expands the plug 27 moves away from the plug 31, and the spring 25 is effective for moving the lever from the position shown in Figure 7 to the position shown in Figure 6.

This construction, like the construction shown in Figure 1, has the advantage of providing a structure wherein the desired amplitude of movement is obtained with a single lever extending longitudinally of the expansible and non-expansible members, so that the full benefit of the relative movement between the expansible and non-expansible members is made available without loss through loose connections. Furthermore, there is relatively little wear between the movable parts, so that lost motion will not develop rapidly in the use of the thermostat.

In the construction shown in Figure 6, the rod 29 has its inner end threaded, and this threaded end of the arm projects through the body 20 and carries an indicator 33. The threaded portion of the rod 29 is designated 34. A nut 35 and a packing 36 are provided for preventing leakage of gas from the casing around the threaded rod. A dial for a calibrated segment 37 is secured to the casing 20 and is graduated. By moving the indicator 33 with reference to the graduated segment 37, the rod 29 is screwed in or out with reference to the casing 20 to change the setting of the thermostat. While the construction shown in Figure 6 does not provide for such fine increments of adjustment as are provided for in the construction shown in Figure 1, the arrangement shown in Figure 6 is, nevertheless, one which can be adjusted with considerable accuracy, and the mechanism is much more compact and efficient than mechanisms of the type now in general use. It may also be provided with a differential screw as shown in Fig. 1.

In the construction shown in Figures 6 and 7, it will be seen that the contraction or cooling of the thermostat tends to lift the valve, while the spring 25 tends to rock the lever 30 down and close the valve. This is just the reverse of the arrangement shown in Figure 1, wherein the expansion of the expansible casing tends to positively move the lever toward valve-closing position, so that the only load imposed on the spring 15 is the slight load required to close the valve. It will also be observed that in the construction shown in Figure 6, the rod 29 is placed under compression when the plug 27 is moved to the left by the contraction of the casing 26. Since the rod 29 must resist the compressive stresses, it has to be heavier and more rigid than the rod 7 in the construction shown in Figure 1.

Upon excessive cooling of the thermally responsive member 26, the rod 29 may be put under considerable endwise pressure. This might be sufficient to damage the rod and render the thermostat inaccurate, but this objection can be overcome by the modification shown in Figure 9. In this figure, corresponding reference numerals have been used to designate the corresponding parts. However, the rod 29, instead of terminating in a threaded extension 34, has a reduced end portion 29a. Screwed into the body 20 is a plug 38 carrying the indicator arm 39. A heavy compression spring 40 is received in a socket in the inner end of this plug 38 and bears against the end of the rod 29, the reduced extension 29a projecting into the spring. The spring 40 has sufficient resistance to resist the normal endwise strain on the rod 29 over the operating range of the thermostat, but under excessively high pressures will yield sufficiently to prevent damage to the rod 29.

While it is obvious that the construction shown in Figure 1 possesses many advantages over the construction shown in Figures 6 to 9, inclusive, all of the embodiments of the invention provide a very compact thermostat mechanism in which the usual system of multiplying levers is replaced by a single lever which is rocked by the relative movement between the thermally responsive and the non-responsive elements through an amplitude sufficient to operate a valve or other element to be operated. In utilizing the space around the non-expansible element and inside the expansible element for the lever, the structure is made very compact and yet a lever of considerable length can be provided.

In using a lever of channel shape or tubular form, the necessary rigidity is obtained in a very light construction. Due to the fact that all of the relative movement between the expansible and non-expansibe members can be utilized, the length of the thermostat can be very materially reduced over the length of thermostats of this type now generally employed. This constitutes an economy in the manufacture of the thermostat, especially inasmuch as it permits the use of a shorter rod of Invar steel, this being a relatively expensive material.

While I have fully described certain preferred embodiments of my invention, it will be understood that this is by way of illustration and that the invention is not restricted to the particular embodiments shown, but may be otherwise constructed.

I claim:

1. In a thermostat, a body, an element in the body adapted to be moved back and forth, a tubular casing secured to the body at one end thereof, a rod supported by the body extending longitudinally of the casing and within the casing, said casing having a relatively high coefficient of thermal expansion and said rod having a relatively negligible coefficient of thermal expansion, a lever within the casing extending longitudinally thereof, means carried by the casing adjacent the outer end of said lever providing a pivotal support therefor, means at the end of said rod adapted to abut against the end of said lever, the inner end of said lever extending into said body, the element in the body adapted to be operated by the thermostat engaging the inner end of said lever, and a compression spring for yieldably resisting the movement of the lever in one direction.

2. In a thermostat of the type wherein a non-expansible member extends longitudinally within a thermally responsive casing, a lever within the casing extending longitudinally thereof and cooperating with the member and the casing, said lever being pivotally supported in the casing and having its end bearing against the end of the non-expansible member, whereby any strains put upon the non-expansible member are tensile strains.

3. In a thermostat, a valve body, a valve within the body, a tubular casing secured to the body and projecting therefrom, said casing having a relatively high coefficient of thermal expansion, a lever within the casing extending longitudinally thereof, means at the outer end of the casing providing a pivotal support for the lever, a rod within the casing extending longitudinally of the lever, said rod having a relatively negligible coefficient of thermal expansion, and means at the end of the rod adapted to bear against the end of the lever, the inner end of the lever terminating in the body and being engaged by a portion of said valve.

4. In a thermostat, a valve body, a valve within the body, a tubular casing secured to the body and projecting therefrom, said casing having a relatively high coefficient of thermal expansion, a lever within the casing extending longitudinally thereof, means at the outer end of the casing providing a pivotal support for the lever, a rod within the casing extending longitudinally of the lever, said rod having a relatively negligible coefficient of thermal expansion, and means at the end of the rod adapted to bear against the end of the lever, the inner end of the lever terminating in the body and being engaged by a portion of said valve, said rod being secured to the body at its inner end through a differential screw adjustment.

5. In a thermostat, a valve body, a valve within the body, a tubular casing secured to the body and projecting therefrom, said casing having a relatively high coefficient of thermal expansion, a lever within the casing extending longitudinally thereof, means at the outer end of the casing providing a pivotal support for the lever, a rod within the casing extending longitudinally of the lever, said rod having a relatively negligible coefficient of thermal expansion, and means at the end of the rod adapted to bear against the end of the lever, the inner end of the lever terminating in the body and being engaged by a portion of said valve, said rod having a threaded inner end, a bushing into which the threaded inner end of the rod is screwed, said bushing being screwed into the body, the thread between the body and the bushing having a greater pitch than the thread between the bushing and the rod.

6. In a thermostat, a body, an element in the body adapted to be operated by the thermostat, a tubular casing secured to the body and having a relatively high coefficient of thermal expansion, a lever within the tubular casing extending longitudinally thereof, means at the outer end of the casing on which the lever is pivotally supported, the inner end of the lever projecting into the body, the element within the body to be operated by the thermostat bearing against the inner end of the lever, a compression spring bearing against the inner end of the lever, and an elongated member secured to the body extending longitudinally of the casing within the casing, this member having a head at the outer end thereof adapted to cooperate with the end of the lever.

7. In a thermostat, a body, a tubular casing secured to the body, a lever within the casing extending longitudinally thereof, a pivot for the lever adjacent the outer end of the casing, a rod within the casing extending longitudinally thereof, said rod having a head at the end thereof, the outer end of the lever being notched to cooperate with said head, the inner end of the rod being threaded, a bushing screwed into the body into which the rod is screwed, the threads between the bushing and the body being of different pitch from the threads between the bushing and the rod whereby a differential screw connection is provided between the rod and the body, said rod being held against rotation within the casing when the bushing is turned, the rod having a negligible coefficient of thermal expansion and the casing having a relatively high coefficient of thermal expansion.

8. In a thermostat, a tube member, a rod member in the tube member, one of said members being an expansible member and one of them being a relatively inexpansible member, a body to which both members are anchored, the body having a threaded member into which the rod member is screwed, a lever in the tube member pivotally supported therein, said rod being secured in tension between a portion of the lever with which it is operatively engaged and a threaded member in which it is anchored.

9. In a thermostat, a body, a tube member secured to the body constituting the expansible element of the thermostat, a nut rotatably mounted in the body, a rod within the tube having one end in threaded engagement with the nut, said rod having a relatively low coefficient of thermal expansion, a lever within the tube member operatively engaging the outer end of the rod and the outer end of the tube member, a valve element in the body movable toward and away from a valve seat, a spring for moving the valve into engagement with the seat, an extension on the valve engaging the lever, and another spring operating against the lever in opposition to the first spring and being capable of compressing the first spring, said first spring serving to close the valve upon the heating of the thermostat, the lever being arranged to compress said second spring upon heating of the thermostat.

10. In a thermostat, a body, a thermally responsive tube member anchored to the body, a lever in the tube member, a pivot for the lever adjacent the outer end thereof attached to the outer end of the tube member, a substantially non-expansible rod anchored to the body member and fixed against free longitudinal movement and extending longitudinally of the tube member, the outer end of the rod being operatively connected with the lever at a point eccentric to said pivot.

11. In a thermostat, a body, a thermally responsive tube member anchored to the body, a lever in the tube member, a pivot for the lever adjacent the outer end thereof attached to the outer end of the tube member, a substantially non-expansible rod anchored to the body member and fixed against free longitudinal movement and extending longitudinally of the tube member, the outer end of the rod being operatively connected with the lever at a point eccentric to said pivot, said rod being secured to the body member by means of a nut on the body member into which the end of the rod is threaded.

12. In a thermostat of the type wherein a non-expansible member extends longitudinally within a thermally responsive casing, a lever within the casing extending longitudinally thereof and pivotally connected to the said casing near its outer end and cooperating with the member and the casing.

13. In a thermostat, a valve body, a tubular casing secured to the valve body constituting the thermally responsive element of the thermostat, a valve operating lever extending longitudinally within the casing and pivotally supported at the end distant from the valve body by the said tubular casing, and a non-expansible rod in the casing having one end rigidly anchored to the valve body, and an abutment on the rod contacting with said lever eccentrically of its pivotal support providing a fixed fulcrum for the lever.

In testimony whereof I have hereunto set my hand.

FREDERICK K. LANDGRAF.